United States Patent Office 3,358,267
Patented Dec. 12, 1967

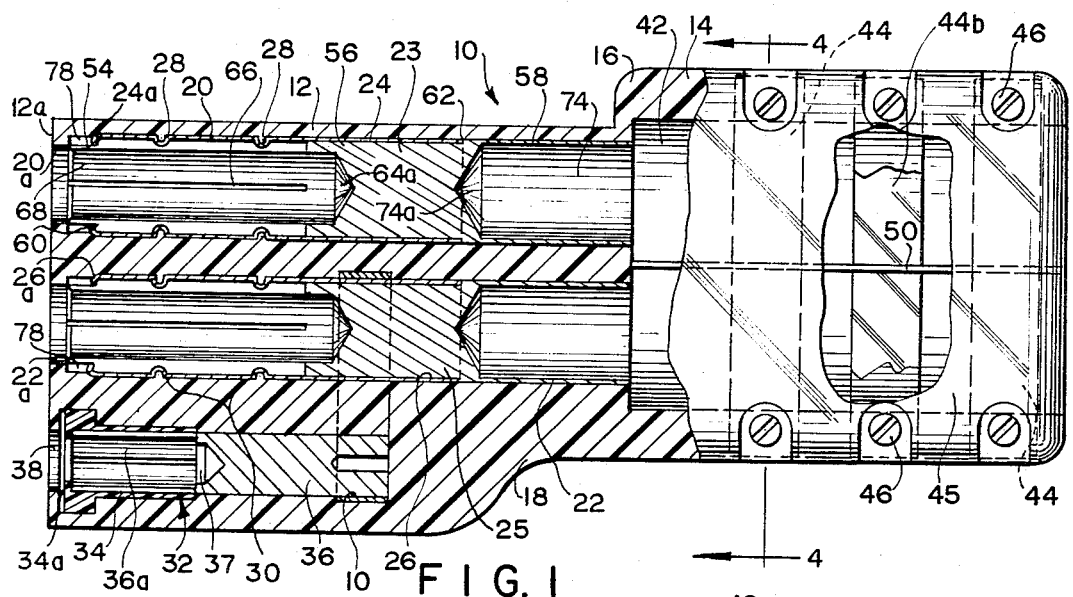

3,358,267
AIRCRAFT EXTERNAL POWER CONNECTOR
John B. Henderson, Cohasset, Mass., assignor to Chase Corporation, Randolph, Mass.
Filed Aug. 27, 1965, Ser. No. 483,034
6 Claims. (Cl. 339—217)

ABSTRACT OF THE DISCLOSURE

An aircraft external power connector has an insulated housing with at least one lengthwise passage extending therethrough. A strong tubular conductive passage liner is molded into the housing. The liner wall has one or more circumferential grooves which lock the liner against axial movement within the housing. These grooves also form circumferential ribs within the liner which interfit with mating grooves in a female conductive element slidably received within the liner so as to lock the two together.

This invention relates to an improved external power connector for an aircraft. It relates more particularly to an aircraft external power connector which provides continous low resistive electrical connections between a cable leading to a mobile generator and the aircraft's electrical system. Yet the connector can be detached readily from the cable in the event that it becomes damaged in use.

The external power connectors involved here are used to connect a mobile generator to an aircraft to supply temporary power to the aircraft when the plane's own electrical generating source is turned off. This maintains the plane in a ready condition so that it can take off quickly.

In use, these connectors are subjected to extremely rough handling and abuse. Planes and trucks frequently run over them. Also, at military installations, the planes actually take off while the connectors are still attached thereto. When this occurs, the connectors are jerked from the mating plug in the plane. As a result, the connector housing cracks and breaks apart entirely under the strain.

Formerly these power connectors were permanently secured to the long cable leading to the generator. Thus, when the connector became damaged, the entire assembly including the cable had to be thrown away. Bearing in mind that these cables consist of a plurality of half-inch or more diameter stranded copper conductors and are usually 20 to 40 feet long, the prior practice was extremely wasteful and expensive.

To overcome this problem, a detachable connector was devised which, when damaged, could be removed from the cable and replaced with a new one so that the cable could be reused.

These prior detachable plugs were disadvantaged, however, in that they employed screw connections to electrically connect the cable to the main conductive elements of the connector. The screws soon loosened under the rough handling given the connector, causing arcing within the connector housing. Not only did this condition interrupt the electrical service to the plane, but also it constituted a real fire hazard because of the presence in the area also of very volatile aircraft fuels. What is more, this dangerous situation could not always be detected simply by looking at or handling the connector assembly and thus it frequently went unnoticed for long periods of time.

Further, these prior screw-type connectors could not stand up under the rough handling given them. They had a high rate of breakage and their life expectancy was quite short.

Accordingly, this invention aims to provide an improved external power connector for aircraft which is detachable from its associated cable, yet which provides unbroken low resistive electrical connections from the cable to the mating conductive elements of the connector.

A further object of this invention is to provide an aircraft external power connector which is reinforced against breakage due to stresses developed when disconnecting the unit from the aircraft.

A still further object of this invention is to provide an external power connector for an aircraft whose mating conductive elements are locked in place within an insulating housing as long as the unit is serviceable; but which can be removed readily from the housing should that be damaged in use.

Another object of this invention is to provide an external power connector for an aircraft which is extremely rugged and reliable, yet which is relatively easy and inexpensive to make.

The invention accordingly comprises the features of construction, combination of elements, and arrangement of parts which will be exemplified in the construction hereafter set forth, and the scope of the invention will be indicated in the claims.

For a fuller understanding of the nature and objects of the invention, reference should be had to the following detailed description taken in connection with the accompanying drawing, in which:

FIG. 1 is a view partly in vertical section and partly in side elevation with parts broken away of an aircraft external power connector embodying the principles of my invention;

FIG. 2 is a front end view of the connector of FIG. 1;

FIG. 3 is an exploded perspective view with parts broken away of a portion of the connector of FIGS. 1 and 2, and FIG. 4 is a view along line 4—4 of FIG. 1.

In general, my improved aircraft external power connector employs a plurality of female conductive elements which are adapted to mate with corresponding male elements mounted in a receptacle on the plane. These female elements are soldered or crimped directly to the conductors of an associated cable leading to the external power source so that there is a continuous low resistive electrical path from the generator to the female elements of the connector. The female conductive elements are removably secured in passages within an insulating housing. The passages are provided with strong conducting liners which snugly encase the conductive elements. Further, the elements and liners have interfitting ribs which prevent ready removal of the elements from the housing. When the connector is mated with the outlet on the aircraft, these same interfitting ribs lock the conductive elements in place so that they cannot be pulled out of the housing before the connector is removed from the electrical outlet on the aircraft.

Referring more specifically to FIGS. 1 and 2 of the drawing, my improved connector comprises a housing 10 constructed of a durable abrasion resistant material. Rubber-like or synthetic polymers are acceptable. Housing 10 has a generally ovular forward section 12 which contains the main conductive elements of the connector and a slightly narrower, generally rectangular, hollow rear section 14 which encloses the exposed end of the associated cable. The two housing sections 12 and 14 are offset in a vertical plane forming upper and lower shoulders 16 and 18 respectively. Shoulders 16 and 18 facilitate grasping the connector when inserting and removing it from the mating receptacle in the aircraft.

The forward housing section 12 is formed with two parallel lengthwise bores 20 and 22 which extend from the front face 23 of section 12 to the interior of rear section 14. These bores accommodate the main female conductive elements 23 and 25 respectively of the connector. The bores 20 and 22 have reduced diameter mouths 20a and 22a adjacent the front face 12a which help to guide the male plug elements into the respective connectors as will be described later.

Still referring to FIG. 1, the bore 20 and 22 are provided with tubular conductive liners 24 and 26 respectively. These are preferably made of a strong metal such as brass and are actually molded into the housing 10 at the same time that is formed. The liner 24 extends from a point just inside mouth 20a along bore 20 terminating at a point approximately even with shoulder 18. The liner 26 extends from inside mouth 22a for the same distance along bore 22. The forward ends of liners 24 and 26 are inwardly rolled at 24a and 26a respectively forming annular abutments spaced inwardly from the mouths 20a and 22a respectively.

A pair of spaced-apart, inwardly directed, circumferential ribs 28 are formed in the liner 24. A similar pair of ribs 30 are formed in liner 26. Thus, when the housing 10 is molded, with the liners in place, the plastic material flows into the outside grooves formed by the ribs 28 and 30 securely anchoring the liners against axial movement within the housing 10. These ribs 28 and 30 also serve along with abutments 24a and 26a to lock the conductive elements 23 and 25 in place within the housing as will be described later.

Still referring to FIGS. 1 and 2, the forward housing section 12 includes also the usual control electrode assembly indicated generally at 32 all of which is molded into the housing 10 at the time that is formed. The assembly 32 comprises more specifically a tubular insulating bushing 34, of nylon for example, extending parallel to bores 20 and 22. A female conductive element 36 is positioned coaxially within bushing 34 with its bore 37 facing an opening 38 in the front face 12a of housing section 12. The walls of bore 36 are slit lengthwise forming a circular array of resilient tines 36a which serve to resiliently engage the corresponding male plug element (not shown) that is received into the bore 36 when the connector is coupled to the aircraft.

The bushing 34 has a reduced diameter lip 34a which overhangs the outer ends of tines 36a preventing the mating male plug element from contacting the tines 36a until it is inserted a considerable distance into the bore 37. The usual conductive jumper 40 may be provided to electrically connect the conductive element 36 of the control assembly 32 to the sleeve 26 as is required by the regulations at some airports.

Referring now to FIGS. 1 and 4, as mentioned previously, the rear housing section 14 is hollow, having a cavity 42 communicating with bores 20 and 22. Three clamps 44 are molded into the housing at the time of its formation. Each clamp 44 comprises an upper strap 44a and an opposing lower strap 44b. Screws 46 recessed into the upper wall 45 of the housing section 14 extend into section 14, through the opposing ends of straps 44a and 44b and out the lower wall 47 of housing section 14. Threaded nuts 48 recessed into the lower wall 47 engage over the threaded ends of the screws. The two straps of each clamp 44 are arranged within the cavity 42 so that they can be drawn together by turning down on the screws 46. An insulating spacer 50 divides the cavity 42 into two equal parts with one part opening into bore 20 and the other part opening into bore 22. The spacer 50 serves to electrically isolate the two cable wires 52 (FIG. 3) that are inserted into the housing section 14. The clamps 44, of course, clamp the cable wires 52 in place within the housing.

Referring now to FIGS. 1 and 3, the main female conductive elements 23 and 25 of the connector are identical. Therefore, for simplicity, we will describe their specific construction with reference only to the conductive element 23. Element 23 is constructed of a good conducting material such as copper, for example. It is generally cylindrical in shape, but is shaped to be snugly received within the liner 24. For this, its outside diameter is stepped as illustrated. Proceeding to the right, the conductive element 23 has a relatively small diameter front portion 54, a larger diameter intermediate portion 56 and a still larger diameter rear portion 58. A pair of circumferential shoulders 60 and 62 are formed between the portions 54 and 56 and between the portions 56 and 58 respectively.

Element 23 has a lengthwise bore 64 extending through its portion 54 and terminating at 64a, a substantial distance into portion 56. The wall of bore 64 is slit lengthwise at 66 forming four resilient tines 68 extending from the front of the element 23 almost to the inner end 64a of the bore. A pair of spaced-apart, circumferential grooves 70 are inscribed around the tines 68. These grooves are arranged and adapted to engage the ribs 28 of liner 4 as will be described presently.

Element 23 has another bore 74 extending lengthwise into its right-hand portion 58 and terminating at a point 74a adjacent shoulder 62. Bore 74 serves as a solder well for receiving the bare conductor 76 of cable 52 (FIG. 3).

The conductive element 23 is adapted to be received into the housing section 12 such that the element portions 56 and 58 are snugly received in the liner 24 and the corresponding bore 20 respectively with the shoulder 62 firmly engaging the inner end of liner 24 and the shoulder 50 engaging the abutment 24a at the outer end of liner 24.

In seating the conductive elements 23 and 25 in their respective receptacles, the elements are inserted through the rear housing section 14 and into the respective bores 20 and 22. When the shoulders 60 of the conductive elements encounter the right-hand circumferential rib 28, the resilient tines 68 are deflected inwardly. They remain in this deflected condition until the circumferential grooves 70 are in register with the ribs 28 in the liners. Whereupon the resilient tines snap back to their normal unstressed position with the ribs 28 being received in the corresponding grooves 70. The coacting ribs 28 and grooves 70 are made deep enough and their sides are made steep enough so that a considerable force is required to pull the elements 23 and 25 out of housing section 12.

When the conductive elements 23 and 25 are properly seated in their respective receptacles, the outer ends of the conductive elements 23 and 25 extend to the mouths 20a and 22a respectively of the housing section 12. Yet they are recessed back from the front face 12a of the insulating housing thereby minimizing the chances of making accidental contact with the conductive elements.

As seen in FIG. 1, there is a gap 78 around the portion 54 of each of the two conductive elements 23 and 25 forwardly of their respective liners 24 and 26. Thus a gap 78 extends between the abutment 24a of liner 24 and the mouth 20a of housing section 12. A similar annular gap exists between the abutment 26a and mouth 22a. This annular space 78 around the portion 54 of each conductive element 23 and 25 allows that portion to flex outwardly much more than the portions thereof that are constrained within the respective liners. With this, the outer ends of the conductive elements are able to "give" when the connector is being coupled to or uncoupled from its mating plug on the aircraft thereby reducing the chances of damage to the forward end of the connector. Also the gaps 78 facilitate removal of the elements 23 and 25 as will be described presently.

As seen from the foregoing, the female conductive elements 23 and 25 are soldered directly to the cable conductors 76. There are no relatively high resistive boundaries or junctions between the cable and the female plug elements that can become loosened when the connector is subjected to rough handling.

When the conductive elements 23 and 25 are properly seated within the housing section 12 as aforesaid and the exposed end of the cable 52 is clamped within the housing section 14, the conductive elements are firmly locked in place within the housing. It will be apparent that when the mating male plug elements are received into the bores 64 of the conductive elements 23 and 25, they prevent the inward deflection of the tines 68. Therefore, the conductive elements cannot be pulled out of the housing until the connector is first removed from the mating plug on the aircraft. This feature insures that if an aircraft moves with the connector still coupled to it, the connector will be pulled away from the receptacle in the aircraft before the conductive elements 23 and 25 can be pulled out of and so as to break the connector housing. Of course, the liners 24 and 26 sheathe the conductive elements thereby protecting the plastic housing 10 from even the very strong outward stresses on the tines 68 such as would be caused by the connector being suddenly jerked away at an angle from the mating plug in the aircraft.

When, in time, the housing 10 becomes worn or damaged through use, the conductive elements 23 and 25 and associated cable 52 can be removed from the housing 10 by loosening the clamps 44 and pulling the conductive elements 23 and 25 out through the rear section 14 of the housing 10. The disengagement of the grooves 70 from the ribs 28 may be facilitated by inserting a thin knifelike tool through the mouths 20a and 22a of the housing section 12 and forcing the tines 68 inwardly away from the ribs 28. The annular gaps 78 provide access space for such a tool. Thereupon, the conductive elements may be pulled readily from the housing and reinserted into a new one.

Thus, with my improved aircraft external power connector, the expensive portions thereof comprising the heavy solid conductive elements and the cable may be used again and again resulting in a considerable savings over a period of time to the average airport. Moreover, due to the reinforced construction of the connector, the assembly itself has a much longer useful life. Finally, because of the unitary construction of the conductive elements within the connector, there are no hot spots within the connector housing and no likelihood of arcing, making the connector assembly very safe to use despite the presence of volatile fuels in the area.

It will thus be seen that the object set forth above, among those made apparent from the preceding description, are efficiently attained, and, since certain changes may be made in the above construction without departing from the scope of the invention, it is intended that all matter contained in the above description or shown in the accompanying drawing shall be interpreted as illustrative and not in the limiting sense.

It is also to be understood that the following claims are intended to cover all the generic and specific features of the invention herein described, and all statements of the scope of the invention which, as a matter of language, may be said to fall therebetween.

Having described my invention, what I claim as new and desire to secure by Letters Patent is:

1. An aircraft external power connector comprising an insulating housing, means defining a passage extending through said housing, a tubular conductive liner extending along substantially the entirety of said passage, a female conductive element snugly but removably received in said liner, said female element having separate bores extending from its opposite ends, one of said bores being positioned in said housing and arranged and adapted to receive a mating male plug element, the other of said bores being arranged and adapted to receive a cable conductor and coacting means on said liner and said conductive element for preventing axial movement of said element within said housing.

2. An aircraft external power connector comprising an insulating housing having a hollow rear section and a front section, means defining a passage extending through said front section, a tubular conductive liner for said passage molded into said front section, a female conductive element removably received in said liner, coacting means on said liner and said conductive element for preventing axial movement of said conductive element within said housing, said conductive element having a well in its end facing said rear section, said conductive element having also a deep bore extending in from its other end for receiving a mating plug element, a cable received in said rear housing section, said cable having a conductor extending into said well, means for securing said conductor in said well and adjustable clamping means for securing said cable within said rear section of said housing.

3. An aircraft external power connector comprising an insulating housing, at least one lengthwise passage extending through said housing, a strong tubular conductive liner extending substantially the entire length of said passage for said passage molded into said housing, the wall of said liner being inwardly rolled to form a circumferential groove into which portions of said molded housing extend so as to lock said liner against axial movement within said housing, said inwardly rolled portion also forming inside said liner a protruding circumferential rib, a female conductive element slidably received within said liner, said element having deep wells formed in its opposite ends, said element also having a circumferential groove arranged and adapted to receive said rib when said element is inserted into said liner so that said rib and groove are in register thereby to lock said element within said liner.

4. An aircraft external power connector comprising an insulating housing, said housing having at least one lengthwise passage therethrough, a strong tubular conductive liner for said passage molded into said housing, said liner having at least one circumferential groove around the outside thereof into which portions of said molded housing extend so as to permanently secure said liner against axial movement within said housing, said liner having also at least one circumferential rib extending around the inside thereof, a female conductive element slidably received in said liner, said element having a circular array of resilient tines extending from one end thereof, said tines defining a deep receptacle for receiving a mating male plug element, said element also having a well formed in the opposite end thereof for receiving a cable conductor, means defining at least one circumferential groove in said array of tines, said groove being arranged and adapted to receive a corresponding one of said ribs when said element is slid into said liner, said tines being deflected inwardly by said ribs when said element is slid into said liner until said corresponding ribs and grooves are in register whereupon said tines resume their unstressed condition and press tightly against said ribs so as to lock said element within said housing.

5. An aircraft external power connector as defined in claim 4 wherein one end of said liner terminates inside one end of said passage and the ends of said tines extend beyond said one end of said liner leaving adjacent said one end of said passage an annular space between said tines and the wall of said passage.

6. An aircraft external power connector as defined in claim 5 wherein said housing includes a hollow section communicating with said bores, one or more adjustable cable clamps mounted within said housing section for clamping said cable when that is connected to said element.

References Cited

UNITED STATES PATENTS

| 3,087,137 | 4/1963 | Linn | 339—217 |
| 3,101,229 | 8/1963 | Yopp | 339—217 |
| 3,101,983 | 8/1963 | Van Horssen | 339—217 |
| 3,125,396 | 3/1964 | Bertram | 339—217 |

MARVIN A. CHAMPION, *Primary Examiner.*

RAYMOND S. STROBEL, *Assistant Examiner.*